US 9,103,967 B2

United States Patent
Iikawa et al.

(10) Patent No.: US 9,103,967 B2
(45) Date of Patent: Aug. 11, 2015

(54) GEAR MECHANISM

(75) Inventors: Makoto Iikawa, Saitama (JP); Ichiro Imaei, Tokyo (JP)

(73) Assignee: PENTAX RICOH IMAGING COMPANY, LTD., Tokyo (JP)

( * ) Notice: Subject to any disclaimer, the term of this patent is extended or adjusted under 35 U.S.C. 154(b) by 642 days.

(21) Appl. No.: 13/245,168

(22) Filed: Sep. 26, 2011

(65) Prior Publication Data

US 2012/0075731 A1 Mar. 29, 2012

(30) Foreign Application Priority Data

Sep. 28, 2010 (JP) ................................. 2010-216382

(51) Int. Cl.
  *G02B 7/02* (2006.01)
  *F16H 48/06* (2006.01)
  *F16H 48/20* (2012.01)
  *G02B 7/08* (2006.01)
  *F16H 37/08* (2006.01)

(52) U.S. Cl.
  CPC .............. *G02B 7/08* (2013.01); *F16H 37/0826* (2013.01)

(58) Field of Classification Search
  CPC ............ G02B 7/102; G02B 7/08; G02B 7/10; G02B 7/023; G02B 7/04; G02B 7/021; G02B 7/026; G02B 7/022; G02B 7/09; G02B 15/173; G02B 27/0068; G02B 13/007; G02B 13/0075; G02B 13/009; G02B 13/12

USPC ......... 359/811, 815, 819, 821–824, 813, 826; 475/125, 230, 234, 235, 220, 221, 273
  See application file for complete search history.

(56) References Cited

U.S. PATENT DOCUMENTS 4,898,249 A * 2/1990 Ohmori .......................... 173/176
7,465,248 B2 * 12/2008 Katoh et al. .................. 475/264

FOREIGN PATENT DOCUMENTS

| JP | 06-011636 | | 1/1994 | |
| JP | 7-333699 | | 12/1995 | |
| JP | 10-153731 | | 6/1998 | |
| JP | 10-153731 | * | 9/1998 | ............... G02B 7/04 |
| JP | 2012-072786 | * | 9/2010 | ............... F16H 48/20 |

* cited by examiner

*Primary Examiner* — Stephone B Allen
*Assistant Examiner* — Brandi Thomas
(74) *Attorney, Agent, or Firm* — Greenblum & Bernstein, P.L.C.

(57) ABSTRACT

A gear mechanism having a smaller diameter and achieving an accurate automatic drive includes a central gear supported on a rotational shaft, first and second side gears coaxially positioned on both sides of the central gear, planetary bevel gears supported within side surfaces of the central gear, and sun bevel gears respectively formed on the inner side surfaces of the first and second side gears which are engaged with the planetary bevel gears. At least one of the first and second side gears is provided with a torque adjuster for adjusting the torque of the side gear(s).

16 Claims, 6 Drawing Sheets

GEAR MECHANISM

BACKGROUND OF THE INVENTION

1. Field of the Invention

The present invention relates to a gear mechanism, and more particularly, relates to a gear mechanism which can rotatably drive, for example, one driven member by two different inputs.

2. Description of the Related Art

A lens drive mechanism provided in a lens barrel of camera, for example a focusing lens drive mechanism for carrying out focusing, may have a structure that allows focusing both by a motor-driven automatic operation and by a manual operation. In Japanese Unexamined Patent Publication (J.U.P.P.) No. H10-153731, a planetary gear mechanism is disclosed which includes a first through third gears to form a focusing lens drive mechanism, in which the first gear of this planetary gear device is connected to a focusing lens, the second gear is connected to a motor, and the third gear is connected to a manual operation ring. This focusing lens drive mechanism rotatably drives the first gear either by rotatable driving of the motor or by rotation of the manual operation ring, thus the focusing lens moves in the optical axis direction, whereby the focusing is carried out. According to the focusing lens drive mechanism of the above-mentioned J.U.P.P. No. H10-153731, during auto focusing through rotatable driving of the motor, the third gear is in the fixed state because of load applied toward the manual operation ring side, and the focusing lens is driven by differential rotation at the planetary gear mechanism. Furthermore, during manual focusing through rotation of the manual operation ring, the second gear is in the fixed state because of the load applied toward the motor side, and the focusing lens is driven by differential rotation at the planetary gear mechanism.

According to the focusing lens drive mechanism of the above-mentioned J.U.P.P. No. H10-153731, the load applied toward the manual operation ring side has been utilized during auto focusing, whereas the load applied toward the motor side has been utilized during manual focusing, in order to obtain a differential rotation output at the planetary gear mechanism. However, because there is no means for either adjusting the load on the manual operation ring side nor the load on the motor side, in the case where the load on the motor side is larger than that on the manual operation ring side, when the motor rotates and the rotational torque is transmitted to the planetary gear mechanism, the third gear connected to the manual operation ring cannot remain in a fixed state due to the smaller load on the manual operation ring side, and the focusing lens may not be able to be driven by the planetary gear mechanism.

Furthermore, since the radial dimensions of the planetary gear mechanism of J.U.P.P. No. H10-153731 is large since the sun gear, the planetary gear and the crown gear thereof are provided on the same plane, a gear mechanism using a planetary bevel gear disclosed in J.U.P.P. No. H07-333699 can be utilized therein. The gear mechanism according to J.U.P.P. No. H07-333699 has an input/output gear and output gears positioned coaxial with the input/output gear, engaged with each other via planetary bevel gears and a pair of sun bevel gears; hence, minimizing the outer circumferential size of the gear mechanism, which further achieves downsizing (miniaturization) of the lens barrel into which such a gear mechanism is incorporated. However, according to the gear mechanism of J.U.P.P. No. H07-333699, since a rotational shaft of each planetary bevel gear is inserted into, and supported by, a small hole formed in the inner peripheral portion of the input/output gear, due to the difference in size between the small hole and the rotational shaft, rotational play (i.e., eccentric rotation) occurs during rotation of the planetary bevel gears. This further causes irregular backlash against the engaging sun bevel gear, making it difficult to obtain a rotational output with high accuracy.

SUMMARY OF THE INVENTION

The present invention provides a gear mechanism having a small diameter and which can carry out accurate lens drive operations when applied to a lens drive mechanism of lens barrel.

According to an aspect of the present invention, a gear mechanism is provided, including a central gear rotatably supported on a rotational shaft; first and second side gears which are rotatably supported on the rotational shaft and coaxially positioned on both sides of the central gear in an axial direction of the rotational shaft; planetary bevel gears incorporated in the central gear and rotatably supported within side surfaces of the central gear; sun bevel gears which are respectively formed on inner side surfaces, which face the central gear, of the first and second side gears to be engaged with the planetary bevel gears; and a torque adjuster for adjusting torque in a rotating direction of at least one of the first and second the side gears.

It is desirable for the torque adjuster to adjust the torque so that the central gear rotates while the second side gear remains stationary during rotation of the first side gear, and the central gear rotates while the first side gear remains stationary during rotation of the second side gear.

It is desirable for the torque adjuster to satisfy the following relationship: Th2>Th1>To, wherein Th1 designates a holding torque of the first side gear, Th2 designates a holding torque of the second side gear, and To designates a holding torque of the central gear.

It is desirable for the torque adjuster to include an abutting member having a predetermined friction coefficient; a resilient member which causes the abutting member to apply a resilient abutting force against an outer side surface of at least one of the first and second side gears in the axial direction of the rotational shaft; and an adjusting member for adjusting a deflection amount of the resilient member.

The abutting member can resiliently abut against the outer side surface of one the first and second side gears, by the resilient abutting force in the axial direction of the rotational shaft, while the resilient abutting force is also applied between the other of the first and second side gears and the rotational shaft.

Alternatively, two the abutting members, of respective two the torque adjusters, can resiliently abut against the outer side surfaces of the first and second side gears, respectively, by two the resilient abutting forces in axial directions of the rotational shaft, respectively.

It is desirable for a shaft portion of each of the planetary bevel gears, which extends in a radial direction of the central gear, to be supportively sandwiched between inner side surfaces of the first and second side gears that face each other and face the central gear provided therebetween, and wherein each of the side gears does not provide a shaft for the planetary bevel gears.

It is desirable for a clearance to be provided between each of the planetary bevel gears and the rotational shaft so that an inner end of the shaft portion of each of the planetary bevel gears does not contact an outer peripheral surface of the rotational shaft.

It is desirable for at least one gear of the central gear and the first and second side gears to be engaged with a larger-diameter gear, and for the gear that is engaged with the larger-diameter gear to be provided with teeth on an outer circumferential portion thereof, and a cushion device which allows elastic deformation of the teeth in a radial direction towards the central axis of the gear, wherein the cushion device is provided on an inner circumferential side of the teeth.

It is desirable for the central gear to include an output gear which is connected to a driven member, and for the first and second side gears to include first and second input gears which are respectively connected to different drive sources.

It is desirable for the gear mechanism to be provided in a lens drive mechanism of lens barrel of camera, the output gear to be connected to a drive member of a driven lens, the first input gear to be connected to a motor drive source, and the second input gear to be connected to a manual operation member.

It is desirable for the torque adjuster to adjust the torque so that, while the driven lens has not reached a terminus position, the output gear rotates while the second input gear remains stationary during rotation of the first input gear, and the output gear rotates while the first input gear remains stationary during rotation of the second input gear.

It is desirable for the torque adjuster to have the following relationship during a motor-driven operation of the motor drive source:

when To=∞: Th2>Tk1, when To≠∞: Th2>To, and Tk1>To; and for the torque adjuster to have the following relationship during a manually-driven operation of the manual operation member:

when To=∞: Th1>Tk2 or Th1<Tk2, when To≠∞: Th1>To, and Tk2>To, wherein Th1 designates the holding torque of the first input gear, Tk1 designates the rotational torque of the first input gear, Th2 designates the holding torque of the second input gear, Tk2 designates the rotational torque of the second input gear, and To designates the holding torque of the output gear.

In an embodiment, a gear mechanism is provided, including a central gear rotatably supported on a rotational shaft; at least three through-hole cavities provided in the central gear in radial direction thereof; first and second side gears which are rotatably supported on the rotational shaft and coaxially positioned on both sides of the central gear in an axial direction of the rotational shaft; at least three planetary bevel gears rotatably supported in the through-hole cavities, respectively, of the central gear; sun bevel gears which are respectively formed on inner side surfaces, which face the central gear, of the first and second side gears to be engaged with the planetary bevel gears; and a torque adjuster for adjusting torque between the first and second the side gears.

It is desirable for at least one of the first and second the side gears to be provided with the torque adjuster. In an embodiment, a lens barrel is provided, including a central gear rotatably supported on a rotational shaft, the central gear being connected to a driven lens that is provided in the lens barrel so that the rotation of the central gear causes the driven lens to move in an optical axis direction thereof; a side gear which is rotatably supported on the rotational shaft and coaxially positioned on one side of the central gear in an axial direction of the rotational shaft; planetary bevel gears incorporated in the central gear and rotatably supported within side surfaces of the central gear; sun bevel gears which are respectively formed on inner side surfaces, which face the central gear, of the side gear to be engaged with the planetary bevel gears; and a torque adjuster for adjusting torque in a rotating direction of the side gear, so that when the side gear is rotated, the rotation of the side gear is transmitted to the driven lens through the central gear, whereas when an external force is applied to the driven lens to move the driven lens in an optical axis direction, the rotation of the side gear is restricted so as not to move the driven lens.

According to the gear mechanism of the present invention, the central gear, and the first and second side gears are coaxially positioned, and a plurality of planetary bevel gears, rotating within the central gear, are engaged with the sun bevel gear of the first and the second side gears respectively. Therefore, the gear mechanism may have a smaller diameter, and the rotational torque of each gear can be adjusted by a torque adjuster provided at least one of the first and second side gears. The torque adjuster can adequately set the rotational torque both on the input and output sides during rotation of planetary gears, and in particular, can achieve an accurate operation on the input side.

The present disclosure relates to subject matter contained in Japanese Patent Application No. 2010-216382 (filed on Sep. 28, 2010), which is expressly incorporated herein by reference in its entirety.

BRIEF DESCRIPTION OF THE DRAWINGS

The invention will be described below in detail with reference to the accompanying drawings, in which.

DESCRIPTION OF THE EMBODIMENTS

Figure 1:
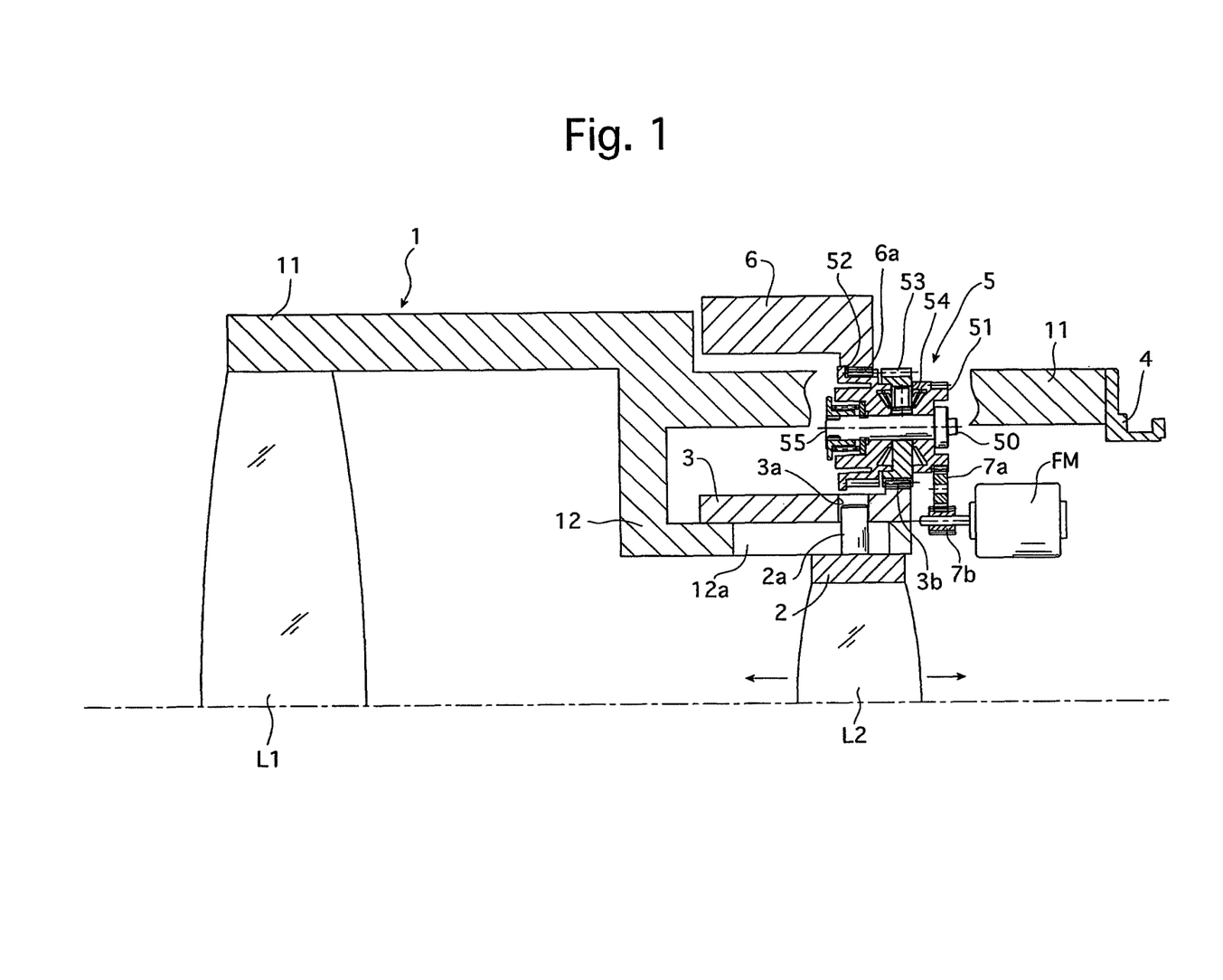
FIG. 1 is a sectional view of an essential part of a lens barrel, to which a gear mechanism according to a first embodiment of the present invention is applied.

An embodiment of the present invention will now be described with reference to the reference designators in the drawings. FIG. 1 is a sectional view of a first embodiment of a focusing lens drive mechanism, according to the present invention, applied to a lens barrel of camera. For reference, and also for the sake of clarity, FIG. 1 only shows the essential structure that is related to the present embodiment, and the other minor components are not shown. As shown in FIG. 1, a first lens group L1 is supported by a front end of an outer barrel 11 of a fixed barrel 1 of a lens barrel. A second lens group (driven lens) L2, serving as a focusing lens group, is provided inside an inner barrel 12 of the fixed barrel 1, and a lens frame 2 of the second lens group L2 is provided with a cam follower 2a, protruding through a linear guide groove 12a in a radial direction. The linear guide groove 12a is formed in the inner barrel 12. The cam follower 2a is engaged with a cam groove (lead groove) 3a that is formed in a focusing cam barrel (driven member) 3. The focusing cam barrel 3, movement of which in the optical axis direction is prohibited, rotates about the optical axis along the outer periphery of the inner barrel 12. When the focusing cam barrel 3 rotates about the optical axis, the focusing lens group L2 (the lens frame 2)

moves inside the inner barrel 12 by the engagement of the cam groove 3a with the cam follower 2a, whereby a focusing operation is carried out. A lens mount 4, provided at a rear end of the fixed barrel 1, is detachably attached to a camera mount of a camera body (not shown). Both the front and rear movement limits of the lens frame 2 in the optical axis direction are defined mechanically.

A gear mechanism 5 of the present embodiment is provided in a part of the fixed barrel 1, in which a focusing motor FM serving as auto focusing drive motor has been incorporated. The gear mechanism 5 includes a rotational shaft 50, the axis of which extends parallel with the optical axis, and one central gear 53 coaxially provided with the rotational shaft 50. Furthermore, a first side gear 51 is provided behind the central gear 53 in the optical axis direction, and a second side gear 52 is provided in front of the central gear 53 in the optical axis direction. Each of the first and second side gears 51 and 52 are coaxial with the central gear 53 so that the central gear 53 is sandwiched therebetween. The central gear 53, the first side gear 51 and the second side gear 52 are basically spur gears in a shape of thick flat disk, and are provided with teeth 51a, 52a and 53a around the circumferential surfaces thereof, respectively. The central gear 53 serves as an output gear, the first side gear 51 serves as a first input gear, and the second side gear 52 serves as a second input gear. The central gear 53 is in engagement with an outer gear 3b provided on a circumferential part of the focusing cam barrel 3, the first side gear 51 is in engagement with a rotational output pinion gear 7b of the focusing motor FM via a reduction gear 7a, and the second side gear 52 is in engagement with inner teeth 6a of the manual operation ring 6. The manual operation ring 6, movement of which in the optical axis direction being prohibited, is rotatably engaged the outer periphery of the fixed barrel 1, so that a photographer may carry out manual focusing operation via a rotating operation of this manual operation ring 6.

Figure 2:
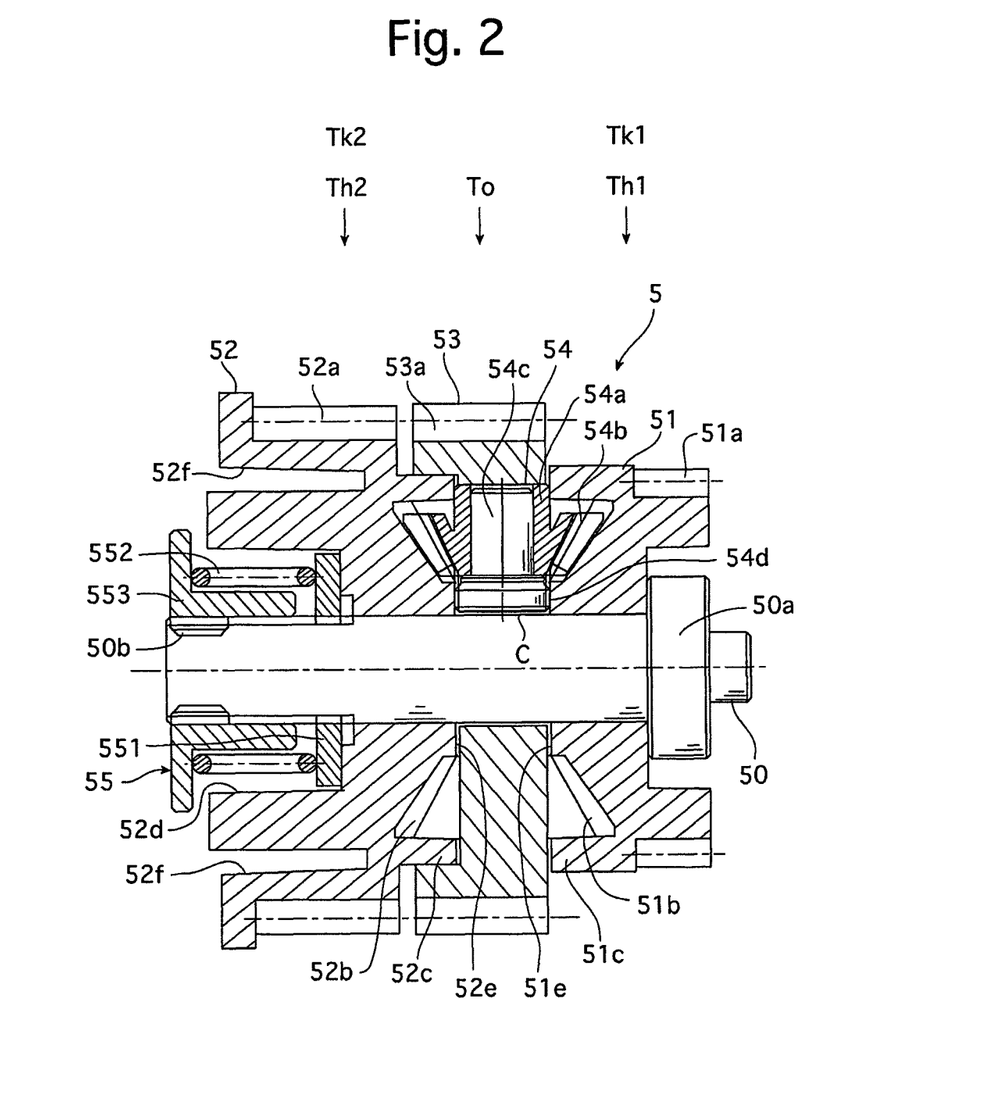
FIG. 2 is an enlarged vertical sectional view of the gear mechanism taken along the optical axis direction.
Figure 3:
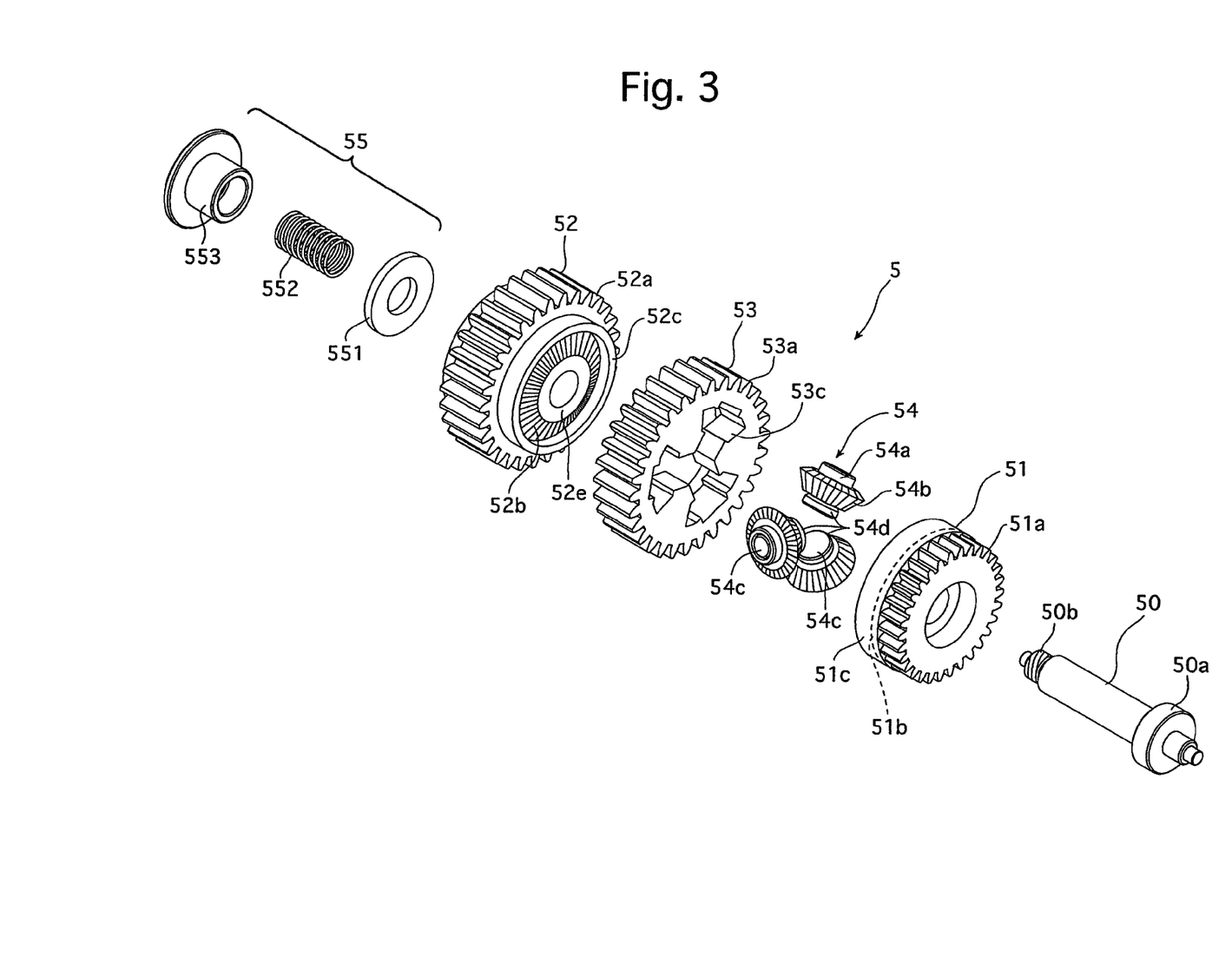
FIG. 3 is a partially exploded perspective view of the gear mechanism.
Figure 4:
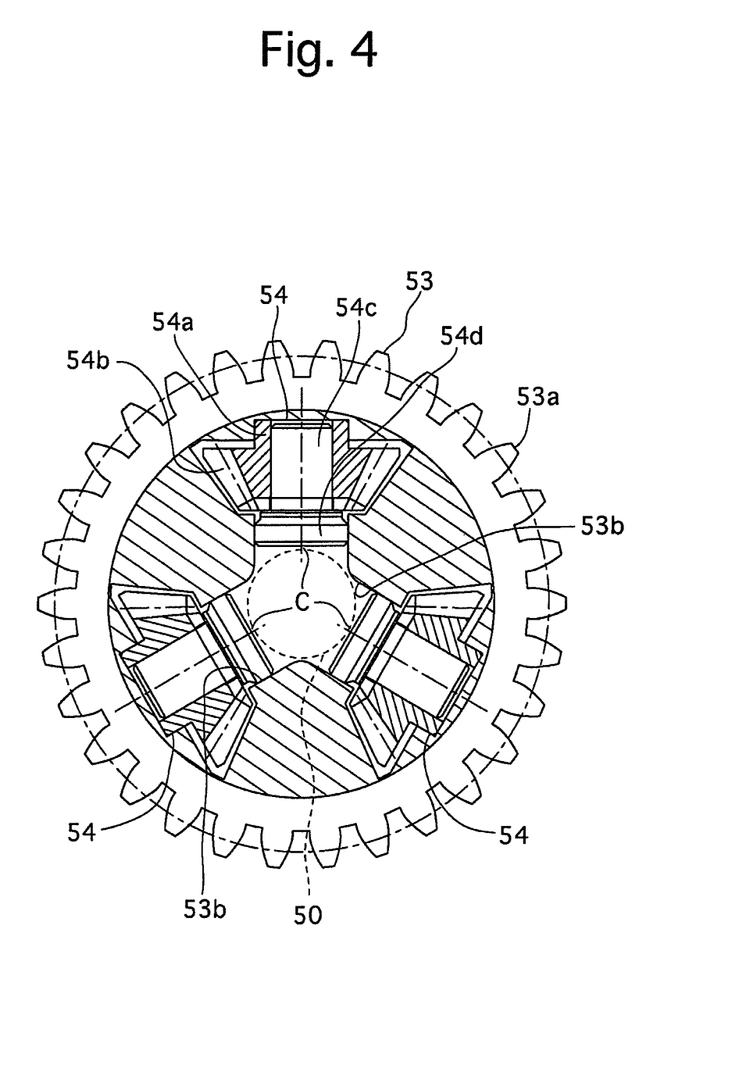
FIG. 4 is an enlarged sectional view of a central gear of the gear mechanism taken along a direction perpendicular to the optical axis direction.

FIG. 2 (an enlarged sectional view taken along the optical axis direction), FIG. 3 (partially exploded schematic view) and FIG. 4 (enlarged sectional view of the output gear taken along a direction perpendicular to the optical axis direction) show the detailed structure of the gear mechanism 5. A trefoil shaped (three-lobed leaf shaped) through-hole cavity 53b, each lobe shape thereof extend in radial directions from the shaft center of the rotational shaft 50, is formed in the output gear 53 at the center thereof. The through-hole cavity 53b incorporates three planetary bevel gears 54, each rotational shaft thereof extending in radial directions. Each of these planetary bevel gears 54 is provided with a shaft portion 54a at one end and a bevel gear portion 54b formed integrally, and a reinforcing metal shaft 54c is inserted into the shaft portion 54a. The other (inner) end of the metal shaft 54c constitutes another shaft portion 54d. Sun bevel gears 51b and 52b, which are respectively provided on inner side surfaces of the first and second input gears 51 and 52 that face the output gear 53, are each engageable with the planetary bevel gears 54. As shown in the sectional view of FIG. 2, when viewing the first and second input gears 51 and 52 as a pair of gears, the sun bevel gears 51b and 52b define a substantial X-shape in section. Sleeves 51c and 52c are formed integrally on the inner side surfaces of the first and second input gears 51 and 52, respectively, so as to also protrude therefrom toward the output gear 53. The sleeves 51c and 52c are respectively formed in a tubular shape and surround the circumference of the sun bevel gears 51b and 52b. The sleeves 51c and 52c both have a length in the axis direction that is equal to that of the end surfaces 51e and 52e of the sun bevel gears 51b and 52b in the axis direction. According to this structure, the three planetary bevel gears 54 are incorporated in the through-hole cavity 53b of the output gear 53, and the first and second input gears 51 and 52 are respectively placed on each side surface of the output gear 53, with respect to the optical axis direction, whereby each of the planetary bevel gears 54 engages with the sun bevel gears 51b and 52b of the first and second input gears 51 and 52, respectively. The shaft portions 54a and 54d at each end of the planetary bevel gear 54 respectively come in contact with, and thus are supportively sandwiched between, the sleeves 51c and 52c as well as the end surfaces 51e and 52e of the sun bevel gears 51b and 52b of the first and second input gears 51 and 52, which are placed oppositely to face with each other in the optical axis direction.

As shown in FIGS. 2 and 4, the planetary bevel gears 54 and the rotational shaft 50 are arranged so that inner end of the shaft portion 54d of each of the planetary bevel gears 54 and outer peripheral surface of the rotational shaft 50 do not contact each other (clearances c are provided therebetween). Accordingly, unwanted friction is prevented, so that the planetary bevel gears 54 can rotate smoothly while reducing noise, and hence, improving the durability of the gear mechanism 5.

Axes of the planetary bevel gears 54 orthogonally intersect the axis of the rotational shaft 50.

A stopper 50a, having a large diameter, is provided at the rear end of the rotational shaft 50. The stopper 50a abuts against the outer side surface of the first input gear 51 in the optical axis direction, whereby the first input gear 51 can be prevented from coming off the rotational shaft 50. A circular shaped cavity 52d is formed in the outer side of the second input gear 52, around the rotational shaft 50 (see FIG. 2). The cavity 52d accommodates a torque adjuster 55 for adjusting a holding torque and a rotational torque, which will be discussed hereinafter. The torque adjuster 55 is provided with a circular shaped washer (abutting member) 551 that is in contact with the inner base surface of the cavity 52d, a coil spring (resilient member) 552, one end thereof being contact with (resiliently abutting against) the front-side surface of the washer 551, and an adjusting nut 553 having a female thread which is engaged with a male thread 50b formed at the front end of the rotational shaft 50. The adjusting nut 553 has an integrated flange, the rear side of which comes in contact with the other end of the coil spring 552 in the axis direction. In the torque adjuster 55, the deflection amount of the coil spring 552 is adjusted by adjusting the axial engagement position of the adjusting nut 553 with respect to the rotational shaft 50, whereby the resilient abutting force of the washer 551 against the inner base surface (outer side surface of the second input gear 52) of the cavity 52d is adjusted. Accordingly, due to the frictional force generated by the abutting force of the washer 551, the rotational resistance of the second input gear 52, i.e., the rotational torque, can be adjusted. The washer 551 is made of a material having a large friction coefficient, so that the frictional force becomes larger when the washer 551 abuts against the inner base surface of the cavity 52d of the second input gear 52. This abutting force is applied to a portion where the outer side surface of the first input gear 51 is in contact with the side surface of the stopper 50a, however, the friction coefficient of these two surfaces that are in contact with each other is smaller than the torque adjustment amount of the second side gear 52 adjusted by the torque adjuster 55.

The second input gear 52 is made of a synthetic resin material, and is provided with the teeth 52a around the outer peripheral surface thereof. A ring-shaped cushion groove 52f is formed on the inner side of the teeth 52a. This ring-shape cushion groove 52f facilitates the elastic deformation of the outer periphery of the second input gear 52, i.e., the teeth 52a provided on the outer circumferential portion of the cushion groove 52f, in a radial direction. This elastic deformation serves for maintaining a favorable engagement state with inner teeth of the manual operation ring 6, which is discussed hereinafter.

According to the above-discussed structure, when the focusing motor FM is driven by an AF (auto-focusing) circuit (not shown) during auto focusing, the rotating force of the focusing motor FM is transmitted, via the reduction gear 7a, to the first input gear 51, whereby the first input gear 51 rotates. In this case, because the manual operation ring 6 is not operated (i.e. is stationary), the second input gear 52 which is engaged with the manual operation ring 6 is also stationary. Thus, due to the engagement of the sun bevel gear 51b of the first input gear 51 with the planetary bevel gears 54, the planetary bevel gears 54 revolve, and the integrated output gear 53 also rotates. The rotation of the output gear 53 is transmitted to the focusing cam barrel 3, whereby the focusing cam barrel 3 rotates. Accordingly, due to the cam engagement between the cam groove 3a and the cam follower 2a, the focusing lens group L2 (the lens frame 2) moves inside the inner barrel 12 in the optical axis direction, whereby focusing operation is carried out.

During manual focusing, when a photographer rotates the manual operation ring 6, the second input gear 52, which is in engagement with the manual operation ring 6, also rotates. In this case, because the focusing motor FM is not driven, the first input gear 51, which is in engagement with the focusing motor FM, is stationary. Thus, due to the engagement of the sun bevel gear 52b of the second input gear 52 with the planetary bevel gears 54, the planetary bevel gears 54 revolve, and the output gear 53, supporting these planetary bevel gears 54, also rotates. The rotation of the output gear 53 is transmitted to the focusing cam barrel 3, whereby the focusing cam barrel 3 rotates. Accordingly, likewise in the case of auto focusing, the focusing lens group L2 (the lens frame 2) moves inside the inner barrel 12 in the optical axis direction, whereby the focusing is carried out.

The holding torque and rotational torque of each gear, shown in FIG. 2, is defined hereinbelow:

Holding torque Th1 (first input gear 51)=Original holding torque of the first input gear 51 itself+Holding torque of the reduction gear 7a and the rotational output pinion gear 7b+Holding torque when the focusing motor FM is rotated by an external force.

Holding torque Th2 (second input gear 52)=Original holding torque of the second input gear 52 itself+Holding torque of the manual operation ring 6.

Holding torque To (Output gear 53)=Original holding torque of the output gear 53 itself+Holding torque of the focusing cam barrel 3 (including any holding torque converted from the movement force of the focusing lens group L2).

Rotational torque Tk1 (first input gear 51)=Motor drive torque−Th1.

Rotational torque Tk2 (second input gear 52)=Manual rotational torque−Th2.

Furthermore, the holding torque To at the output gear 53 varies as indicated below:

To=∞: when the focusing lens group L2 (the lens frame 2) has reached a terminus position (front or rear movement limit).

To≠∞: when the focusing lens group L2 (the lens frame 2) has not reached the terminus position (namely, a normal operation).

As discussed above, the torque can be adjusted in a manner such that, when the first input gear 51 rotates, the output gear 53 rotates while the second input gear 52 is prevented from rotating, whereas when the second input gear 52 rotates, the output gear 53 rotates while the first input gear 51 is prevented from rotating. In this case, the following relationship among the holding torque Th1 of the first input gear 51, the holding torque Th2 of the second input gear 52, and the holding torque To of the output gear 53 should be maintained:

Th2>Th1>To

When the gear mechanism 5 is applied to a lens barrel, for the purpose of carrying out the same operation as above, the following relationship of torque during motor-driven and manual operations should be maintained:
(During Motor Drive)

In the case where To=∞, the condition Th2>Tk1 should be maintained.

This is to prevent the rotation of the manual operation ring even if the motor is driven to move the focusing lens group over a terminus position.

In the case where To≠∞, the conditions Th2>To and Tk1>To be maintained.

In this case, regarding Th2 and Tk1, the question of which torque is larger makes no difference, and the focusing lens group will move as long as Th2 or Tk1 is larger than To. In this case, Th2 should be set as large as positively possible in order to prohibit rotation of the manual operation ring.
(During Manual Drive)

In the case where To=∞, no specific condition is required (either Th1>Tk2, or Th1<Tk2)

In this case, the focusing motor FM rotates with the rotation of the manual focus ring.

In case where To≠∞, the conditions Th1>To and Tk2>To should be maintained.

In this case, regarding Th1 and Tk2, the question of which torque is bigger makes no difference, and the focusing lens group will move by rotating the manual operation ring, as long as Th1 or Tk2 is bigger than To.

As discussed above, the torque adjuster 55 carries out a torque adjustment on the gears 51, 52 and 53 respectively, via adjustment of engagement position of the adjusting nut 553. Therefore, in the torque adjuster 55, when the deflection amount of the coil spring 552 increases by the adjusting nut 553, the abutting force of the washer 551 against the side surface of the input gear 52 becomes larger, and this abutting force is transmitted to the output gear 53 via the sleeve 52c and the end surface 52e of the sun bevel gear 52b. This abutting force is further transmitted, from the output gear 53, to the sleeve 51c and the end surface 51e of the sun bevel gear 51b, i.e., to the first input gear 51. Hence, since the washer 551 may be made of any material having large friction coefficient, a large friction force can be obtained, thus the holding torque of the second input gear 52 can be set to the largest possible value.

In regard to the torque adjustment, the engagement state of the adjusting nut 553 should be adjusted in such a manner that, for example, during movement of the focusing lens group L2 by the rotating drive of the focusing motor FM, the manual operation ring 6 does not rotate simultaneously, regardless of the rotation of the focusing motor FM. The focusing lens group L2 can also move by rotation of the manual operation ring 6 when the focusing motor FM is not driven, however, the adjusting nut 553 should be adjusted in such a manner that the rotation of the manual operation ring 6 can be carried out even after the focusing lens group L2 reaches the terminus position so that no more movement is allowed.

By setting the torque using the gears 51, 52 and 53 as discussed above, during auto focusing, when the focusing motor FM is driven and the first input gear 51 rotates, the output gear 53 rotates, whereby the focusing cam barrel 3 and the focusing lens group L2 move in the optical axis direction while the second input gear 52 remains stationary. Thus, focusing can be carried out without rotating the manual operation ring 6. In this case, when the focusing lens group L2 reaches either a front or rear terminus position, the rotation of both the focusing cam barrel 3 and the output gear 53 is locked (prohibited), however, almost no mechanical damage to the focusing motor FM is caused. This is because, although not illustrated, the focusing motor FM is provided with a photo interrupter and a pulse generator (pulser), in which a pulse is not generated when the motor stops, thus the timing of detecting no pulse is determined as reaching the terminus position to stop the motion. Furthermore, brakes are applied to reduce the motor speed when approaching the terminus position. The focusing motor FM may be any motor, including those other than DC motor.

On the other hand, during manual focusing, when a photographer rotates the manual operation ring 6, the second input gear 52 and the output gear 53 rotate, whereby allowing the focusing cam barrel 3 and the focusing lens group L2 to move in the optical axis direction. In this case, as long as the rotational torque of the output gear 53 during rotation of the manual operation ring 6 is not larger than the holding torque of the first input gear 51, the first input gear 51 remains stationary, and therefore the connected focusing motor FM will not be driven by an external force. In this state, when the focusing lens group L2 reaches either the front terminus position or the rear terminus position, the rotation of both the focusing cam barrel 3 and the output gear 53 is locked, which increases the rotational torque of the manual operation ring 6. However, even in such a state, the photographer can increase the operation force applied to the manual operation ring 6, and when this operation force, i.e. the rotational torque, exceeds a predetermined torque, the first input gear 51 rotates and the rotation of the manual operation ring 6 can continue while the focusing motor FM idles. The idle rotation does not incur damage to the focusing motor FM. With this structure, even when the photographer applies an excessive operational force to the manual operation ring 6, rotation of the manual operation ring 6 is allowed, so that no mechanical damage incurred to the manual operation ring 6.

When the rotational torque is adjusted at the torque adjuster 55, the second input gear 52 is depressed in the axis direction against the output gear 53 as well as against the first input gear 51. Thus the shaft portions 54*a* and 54*d* of each of the planetary bevel gears 54 are respectively supportively sandwiched in between the inner side surfaces of the first and second input gears 51 and 52, i.e., between the end surfaces 51*e* and 52*e* as well as between the sleeves 51*c* and 52*c* of the sun bevel gears 51*b* and 52*b*. Accordingly, the shaft portions 54*a* and 54*d* of each of the planetary gears 54 are supported in a closely contacting manner with the inner side surfaces of the two input gears 51 and 52, which contributes to the minimizing of clearance in order to eliminate play around the shaft portions 54*a* and 54*d*. Therefore, with regard to the planetary gears 54, any potential eccentric rotation can be prevented, and a rotational output having high accuracy can be obtained by eliminating the play against the sun bevel gears 51*b* and 52*b*. In particular, with reference to the shaft portion 54*d*, the distance between the shaft centers of the input gears 51 and 52 can be adjusted by changing the thickness (diameter) of the shaft 54*c*, which further contributes to accurate production and cost reduction.

Figure 5:
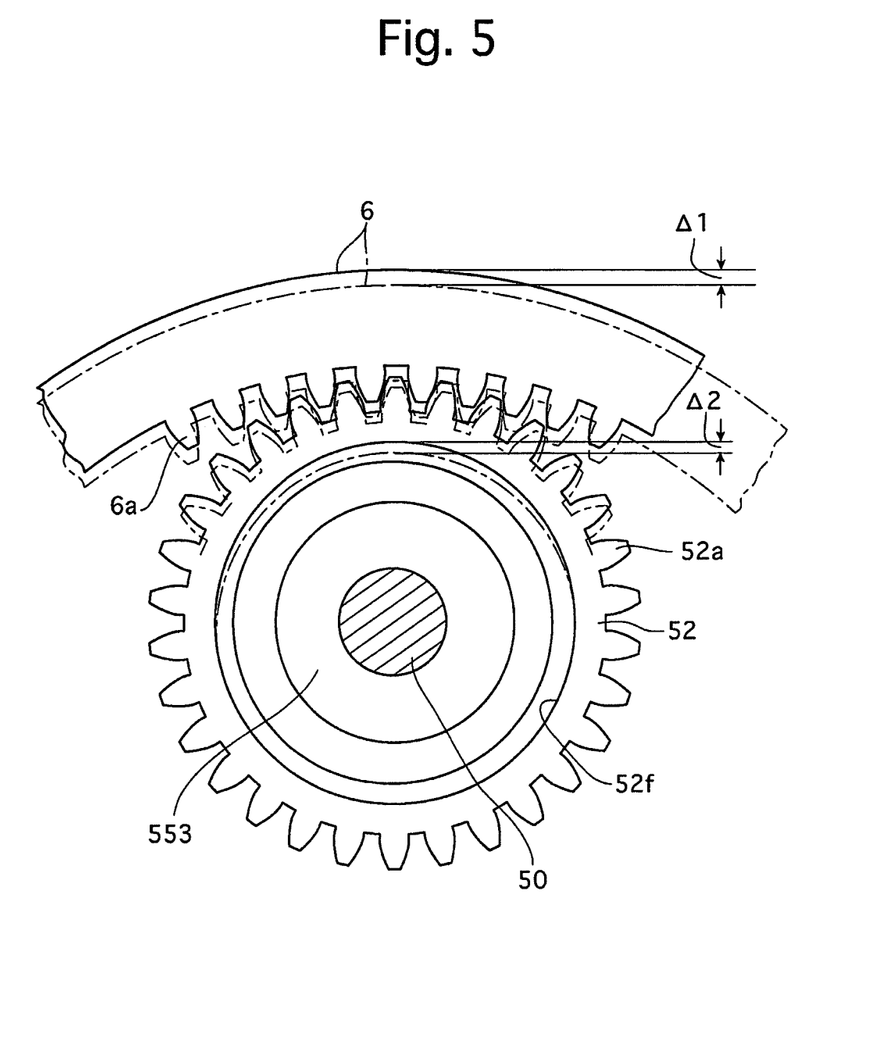
FIG. 5 is a partial side view shown in the optical axis direction, for explaining function of a cushion groove of the gear mechanism.

It is difficult to produce (machine and form) the manual operation ring 6 having a larger diameter while attaining a high roundness, i.e., high diameter accuracy, and it is also difficult to produce the integrated inner teeth 6*a* with high diameter accuracy. FIG. 5 is the illustrative side view showing the engagement state of the manual operation ring 6 with the second input gear 52. When the manual operation ring 6 decenters or deforms from the solid line to the dotted line of FIG. 5, i.e., by the width of an inner diameter (deviation amount) Δ1, the engagement state of the inner teeth 6*a* of the manual operation ring 6 with the teeth 52*a* of the second input ring 52 may vary in accordance with the change of the rotating position of the manual operation ring 6. This would worsen the stable engagement state between the manual operation ring 6 with the second input gear 52, which may result in an unpleasant operational scraping sensation. However, according to this embodiment, the second input gear 52 is made of a synthetic resin material and is provided with the circular cushion groove 52*f* on the inner side of the teeth 52*a*, so that the circular cushion groove 52*f* serves as the cushion device. This circular cushion groove 52*f* facilitates the elastic deformation of the teeth 52*a* of the second input gear 52 in a radial direction, and therefore, even if the deviation amount Δ1 occurs in the diameter of the manual operation ring 6 due to decentering or deformation, this deviation amount Δ1 can be buffered by a deformation amount Δ2 of the cushion groove 52*f* of the second input gear 52, as shown by dotted line of FIG. 5, so that a normal engagement of the manual operation ring 6 with the second input gear 52 can be maintained. Thus a smooth operation of the manual operation ring 6 is secured, which contributes to the improvement of the operational feel. The problem of an unpleasant operational scraping sensation as discussed above may also be solved by increasing the distance between the rotational axes of the manual operation ring 6 and the second input gear 52, however, this would cause a larger backlash, which would further deteriorate the gear transmission efficiency, and have an adverse effect on the downsizing (miniaturization) of the product (lens barrel). The cushion device is not limited to the cushion groove; any structure may be utilized as long as the teeth 52*a* can be elastically deformed in a radial direction towards the circle center, for example, slits formed in a radial direction on the side surface of the second side gear 52, etc.

Figure 6:
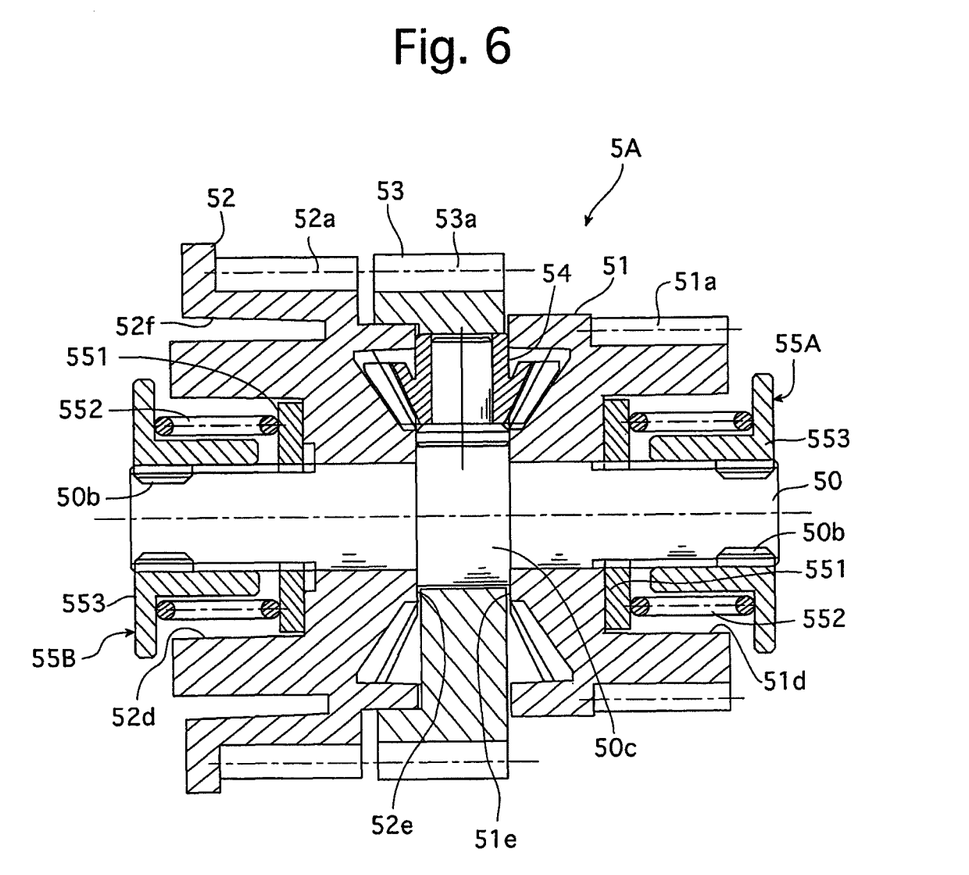
FIG. 6 is a vertical sectional view of a gear mechanism according to a second embodiment of the present invention taken along the optical axis direction.

FIG. 6 shows a sectional view of a gear mechanism 5A according to a second embodiment of the present invention. The gear mechanism 5A of the second embodiment is characterized by two torque adjusters, namely first and second torque adjusters 55A and 55B. Since the remaining structure of the gear mechanism 5A of the second embodiment is basically the same as that of the gear mechanism 5 of the first embodiment, the same reference designators are designated in FIG. 6, and the detailed explanation will be omitted. Only the structure differing from that of the first embodiment will be explained hereinbelow. According to the gear mechanism 5A of the second embodiment, a large diameter portion 50*c* is provided at the center of the rotational shaft 50, with respect to the axial direction thereof, and the output gear 53 is inserted onto the outer periphery of the larger portion 50*c*. Accordingly, for the purpose of independent torque adjustment as described hereinafter, it is desirable for the inner side surfaces of the first and second input gears 51 and 52, i.e., the end surfaces 51*e* and 52*e* of the respective sun bevel gears 51*b* and 52*b* in the axis direction, to be in contact with each of end surfaces of the large diameter portion 50*c* that are perpendicular to the optical axis direction.

The second torque adjuster 55B having the same structure as the torque adjuster 55 of the first embodiment is provided on the outer side surface of the second input gear 52. A circular shaped cavity 51*d* is formed in the outer side surface of the first input gear 51, at a portion including the rotational shaft 50, and the first torque adjuster 55A is placed in this cavity 51*d*. The structure of the first torque adjuster 55A is basically the same as that of the second torque adjuster 55B, and is provided with a washer 551, a coil spring (resilient member) 552, and an adjusting nut 553 to be engaged with the rotational shaft 50 by another male thread 50*b*. Namely, the rotational shaft 50 is provided with a male thread 50*b* at each end (front and rear ends) thereof, with which the adjusting nuts 553 of the first and second torque adjusters 55A and 55B screw-engage, respectively. The torque adjustment of the first torque adjuster 55A can be carried out in the same manner as that of the second torque adjuster 55B, i.e., the torque adjuster 55 of the first embodiment; however, according to the second embodiment, the rotational torque of the first input gear 51 can also be adjusted.

As discussed above, according to the second embodiment, the rotational torque of the first and second input gears 51 and 52 can be adjusted independently by the respective torque adjusters 55A and 55B. Therefore, when the first input gear 51 is connected to the focusing motor FM or the reduction gear 7*a*, having different rotational torque, or when the second input gear 52 is connected to any manual operation ring 6 having different rotational torque, the holding torque of each of the input gears 51 and 52 can be adjusted, whereby the input gears 51 and 52 as well as the output gear 53 can easily maintain the above-discussed relationship between the holding torque and the rotational torque. For the purpose of torque adjustment, for example, the holding torque of the second input gear 52 can be adjusted by the second torque adjuster 55B while the focusing motor FM is driven, and the holding torque of the first input gear 51 can be adjusted by the first torque adjuster 55A while the manual operation ring 6 is rotated.

In the first and second embodiments, the diameter of the first input gear 51 is formed smaller than that of the output gear 53 and the second input gear 52, due to the positioning of the focusing motor FM and the reduction gear 7*a*. However, the first and second input gears 51 and 52 and the output gear 53 can be formed to all have the same diameter, or the first input gear 51 can even have a larger diameter than that of the second input gear 52 and the output gear 53. Furthermore, although the gear mechanism 5 of the first embodiment is only provided with the torque adjuster 55 in the second input gear 52, the gear mechanism 5 of the first embodiment may also be modified so that the torque adjuster is provided only in the first input gear 51, whereby the contact force of this torque adjuster can be applied to the second input gear 52. The torque adjuster may be provided with any spring other than coil spring (552) of the present embodiments.

As discussed above, when the present invention is applied to a focusing mechanism of a lens barrel, the torque adjuster 55, the second input gear 52, the output gear 53 and the first input gear 51 are arranged in that order from the object side, so that the connecting distance between the focusing motor FM (or an AF coupler provided on a camera mount of a camera body (not shown)) and the gear mechanism 5 (first side gear 51) can be reduced to a minimum distance, and the connecting distance between the MF ring (manual operation ring 6) and the gear mechanism 5 (second side gear 52) can be reduced to a minimum distance; moreover, as shown in FIG. 1, the gear mechanism 5 is provided close to the movable lens group (focusing lens group/second lens group L2). According to such an arrangement, a compact lens barrel can be achieved. Note that although the focusing motor FM (i.e., the rotational shaft thereof) extends parallel to the optical axis (i.e., parallel to the rotational central axis of the lens barrel), it is possible for the focusing motor FM to be arranged to extend in a direction orthogonal to the optical axis, depending on the profile/shape of the gears (the first side gear 51, the reduction gear 7*a* and the rotational output pinion gear 7*b*, etc.).

Although the gear mechanism (5 and 5A) according to the first and second embodiments of the present invention has been applied to a focusing lens mechanism of a lens barrel, this gear mechanism may also be applied to a power zooming mechanism in which zooming is carried out by manual operation and motor driven. Furthermore, the present invention may be applied to any camera in which a focusing and/or a zooming motor is incorporated in the camera body. The present embodiment may of course be applied to any mechanism other than camera. Although a DC motor is used in the embodiments for the purpose of explanation, any motor such as stepping motor or an ultrasonic motor can be alternatively used. In this case, the force setting of the coil spring (s) (552) should be changed depending on the type of motor, so that the larger the holding torque of motor is, the smaller the force of coil spring may be. For example, compared with a DC motor, a stepping motor has a larger detent torque and holding torque, and therefore the spring force may be set to a smaller value.

The gear mechanism (5 and 5A) of each of the first and second embodiments is provided with a two-input/one-output gear structure. However, the output gear of the present embodiments may be used as the input gear, and the first and second input gears may respectively be used as the output gears, whereby constituting a one-input/two-output gear structure. In particular, this structure may be applied to any gear mechanism that requires an independent rotational torque of each gear.

The present invention can be applied to any gear mechanism having planetary gears and that allows adjustment of the rotational torque of a plurality of gears.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A gear mechanism comprising:
   a central gear rotatably supported on a rotational shaft;
   first and second side gears which are rotatably supported on said rotational shaft and coaxially positioned on both sides of said central gear in an axial direction of said rotational shaft;
   planetary bevel gears provided within said central gear, and said planetary bevel gears being rotatably supported within said central gear;
   sun bevel gears which are respectively formed on inner side surfaces, which face said central gear, of said first and second side gears to be engaged with said planetary bevel gears; and
   a torque adjuster for adjusting torque in a rotating direction of at least one of said first and second said side gears.

2. The gear mechanism according to claim 1, wherein said torque adjuster adjusts the torque so that said central gear rotates while said second side gear remains stationary during rotation of said first side gear, and said central gear rotates while said first side gear remains stationary during rotation of said second side gear.

3. The gear mechanism according to claim 2, wherein said torque adjuster satisfies the following relationship:

Th2>Th1>To, wherein
- Th1 designates a holding torque of said first side gear,
- Th2 designates a holding torque of said second side gear, and
- To designates a holding torque of said central gear.

4. The gear mechanism according to claim 1, wherein said torque adjuster comprises:
- an abutting member having a predetermined friction coefficient;
- a resilient member which causes said abutting member to apply a resilient abutting force against an outer side surface of at least one of said first and second side gears in the axial direction of said rotational shaft; and
- an adjusting member for adjusting a deflection amount of said resilient member.

5. The gear mechanism according to claim 4, wherein said abutting member resiliently abuts against the outer side surface of one said first and second side gears, by said resilient abutting force in the axial direction of said rotational shaft, while said resilient abutting force is also applied between the other of said first and second side gears and said rotational shaft.

6. The gear mechanism according to claim 4, wherein two said abutting members, of respective two said torque adjusters, resiliently abut against the outer side surfaces of said first and second side gears, respectively, by two said resilient abutting forces in axial directions of said rotational shaft, respectively.

7. The gear mechanism according to claim 1, wherein a shaft portion of each of said planetary bevel gears, which extends in a radial direction of said central gear, is supportively sandwiched between inner side surfaces of said first and second side gears that face each other and face said central gear provided therebetween, and wherein each of said side gears does not provide a shaft for said planetary bevel gears.

8. The gear mechanism according to claim 7, wherein a clearance is provided between each of said planetary bevel gears and said rotational shaft so that an inner end of said shaft portion of each of said planetary bevel gears does not contact an outer peripheral surface of said rotational shaft.

9. The gear mechanism according to claim 1, wherein at least one gear of said central gear and said first and second side gears is engaged with a larger-diameter gear, and
- wherein said gear that is engaged with said larger-diameter gear is provided with teeth on an outer circumferential portion thereof, and a cushion device which allows elastic deformation of said teeth in a radial direction towards the central axis of said gear, wherein said cushion device is provided on an inner circumferential side of said teeth.

10. The gear mechanism according to claim 1, wherein said central gear comprises an output gear which is connected to a driven member, and said first and second side gears comprise first and second input gears which are respectively connected to different drive sources.

11. The gear mechanism according to claim 10, wherein said gear mechanism is provided in a lens drive mechanism of lens barrel of camera, said output gear is connected to a drive member of a driven lens, said first input gear is connected to a motor drive source, and said second input gear is connected to a manual operation member.

12. The gear mechanism according to claim 11, wherein said torque adjuster adjusts the torque so that, while said driven lens has not reached a terminus position, said output gear rotates while said second input gear remains stationary during rotation of said first input gear, and said output gear rotates while said first input gear remains stationary during rotation of said second input gear.

13. The gear mechanism according to claim 12, wherein said torque adjuster has the following relationship during a motor-driven operation of said motor drive source:
- when To=∞: Th2>Tk1,
- when To≠∞: Th2>To, and Tk1>To; and
  - wherein said torque adjuster has the following relationship during a manually-driven operation of said manual operation member:
- when To=∞: Th1>Tk2 or Th1<Tk2,
- when To≠∞: Th1>To, and Tk2>To, wherein
  - Th1 designates the holding torque of said first input gear;
  - Tk1 designates the rotational torque of said first input gear;
  - Th2 designates the holding torque of said second input gear;
  - Tk2 designates the rotational torque of said second input gear; and
  - To designates the holding torque of said output gear.

14. A gear mechanism, comprising:
- a central gear rotatably supported on a rotational shaft;
- at least three through-hole cavities provided within said central gear in radial direction thereof;
- first and second side gears which are rotatably supported on said rotational shaft and coaxially positioned on both sides of said central gear in an axial direction of said rotational shaft;
- at least three planetary bevel gears rotatably supported and provided within said through-hole cavities, respectively, of said central gear;
- sun bevel gears which are respectively formed on inner side surfaces, which face said central gear, of said first and second side gears to be engaged with said planetary bevel gears; and
- a torque adjuster for adjusting torque between said first and second said side gears.

15. The gear mechanism according to claim 14, wherein at least one of said first and second said side gears is provided with said torque adjuster.

16. A lens barrel comprising:
- a central gear rotatably supported on a rotational shaft, said central gear being connected to a driven lens that is provided in said lens barrel so that the rotation of said central gear causes said driven lens to move in an optical axis direction thereof;
- a side gear which is rotatably supported on said rotational shaft and coaxially positioned on one side of said central gear in an axial direction of said rotational shaft;
- planetary bevel gears in provided within said central gear, and said planetary bevel gears being rotatably supported within said central gear;
- sun bevel gears which are respectively formed on inner side surfaces, which face said central gear, of said side gear to be engaged with said planetary bevel gears; and
- a torque adjuster for adjusting torque in a rotating direction of said side gear, so that when said side gear is rotated, the rotation of said side gear is transmitted to said driven lens through said central gear, whereas when an external force is applied to said driven lens to move said driven lens in an optical axis direction, the rotation of said side gear is restricted so as not to move said driven lens.

* * * * *